United States Patent Office 3,147,188
Patented Sept. 1, 1964

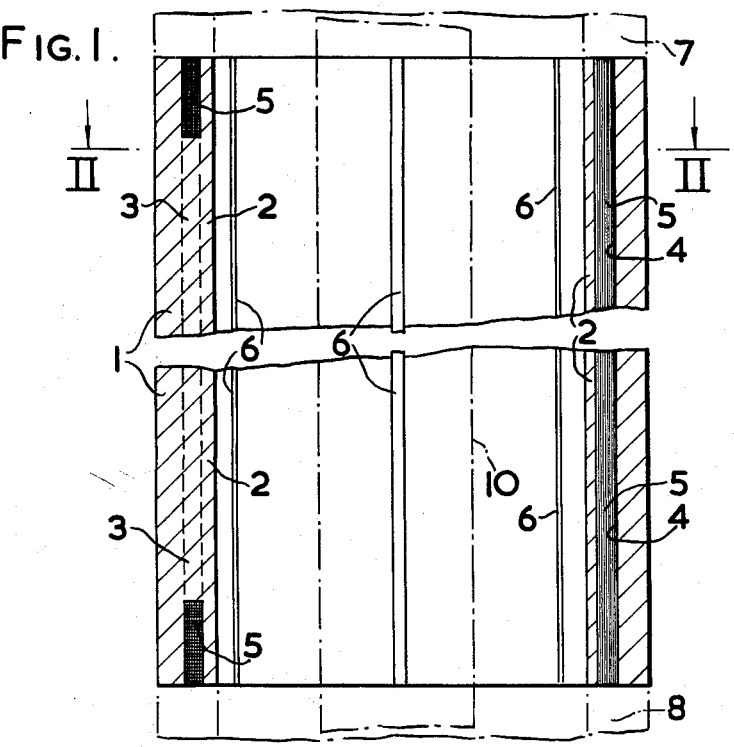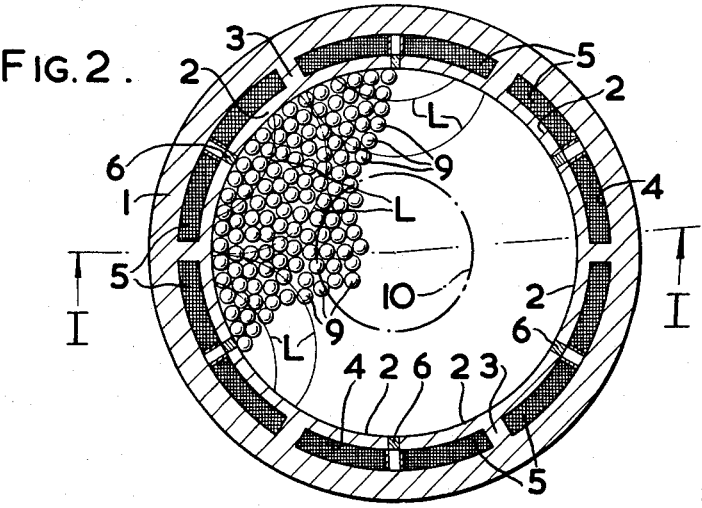

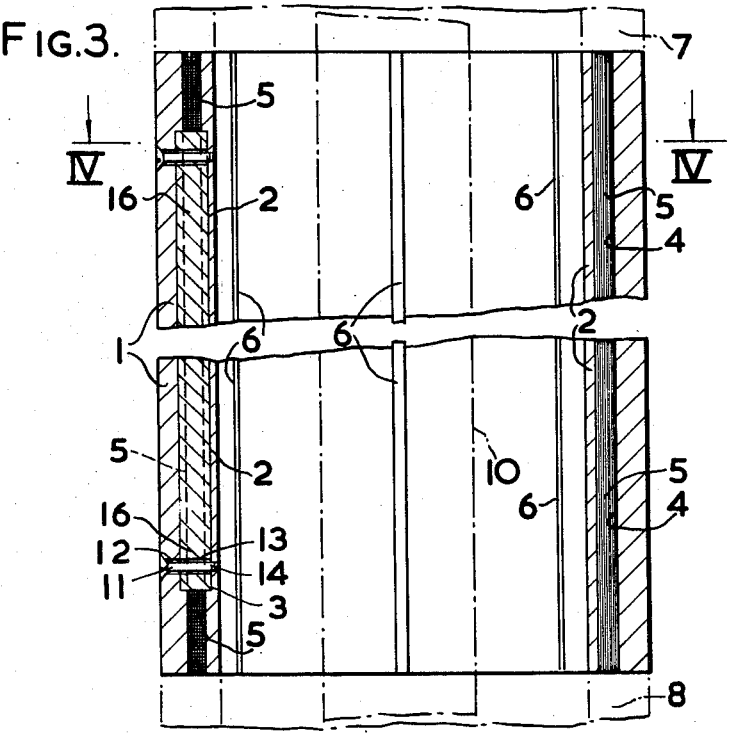
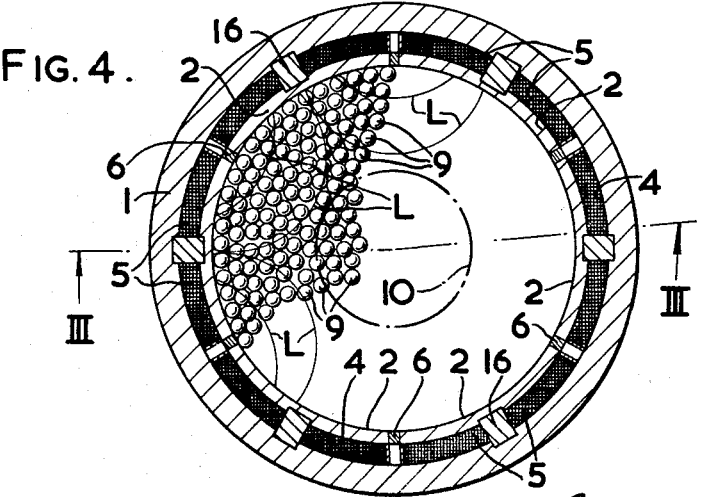

3,147,188
REACTOR SHUT-DOWN APPARATUS USING NEUTRON ABSORBING BALLS
Ronald Hugh Campbell, Bowden, England, assignor to United Kingdom Atomic Energy Authority, London, England
Filed July 7, 1960, Ser. No. 41,285
Claims priority, application Great Britain July 20, 1959
5 Claims. (Cl. 176—35)

This invention relates to shut-down apparatus for nuclear reactors.

In co-pending applications Nos. 824,247, now U.S. Patent No. 3,087,884, and 22,204, filed on July 1, 1959, and April 14, 1960, respectively, embodiments of apparatus for shutting-down nuclear reactors are shown and described. The embodiment described in the former application discloses releasable restraint means for holding a multiplicity of balls formed of or containing neutron-absorbing material in a position in which the balls are outside the reactor core boundary, the balls being allowed to fall into the reactor core on release of the restraint by operation of the apparatus when it is desired to effect shutdown. Such restraint means comprises a magnetic field provided by electromagnetic means and effective across one or more passages for the balls in a manner such that the balls are held against discharge into the reactor core whilst the magnetic field is in existence. The passages are, however, inclined to the vertical necessitating an abrupt change of direction of the balls as they are released to fall into the reactor core.

The embodiment described in the latter application is to some extent similar to the embodiment hereinbefore referred to except that the releasable restraint means comprises an obturating valve preventing discharge of the balls into the reactor core until removed from its obturating position on operation of the apparatus, the valve being operated remotely through a linkage by electromagnetic means. It is considered that the existence of the linkage between valve and operating means constitutes a possible source of breakdown which may prevent the apparatus from operating when desired.

According to the invention, releasable means for restraining a multiplicity of discrete bodies, the material of which at least includes magnetic material, from passage along a tube, comprises magnetic means interposed in the tube and including at least one pair of part-annular pole pieces of opposite polarity, the pole pieces forming between them a passage for the said bodies which is in register with the said tube, the magnetic means when energised forming a magnetic field the lines of force of which pass through at least some of the said bodies and serve to restrain the bodies against movement along the said passage, and demagnetising of the magnetic means serving to release the said bodies for movement along the passage.

It will be appreciated that the invention provides a restraint means which is not subject to either abrupt change of direction of the said bodies as they are released, or to the provision of a linkage which might fail.

For use of the restraint means in connection with shut-down of a nuclear reactor, the flux path of the magnetic means may include discrete portions of material having a Curie point which is exceeded in the event of the ambient temperature becoming in excess of a value related to a maximum safe reactor operating temperature, whereby the bodies, which may be in the form of balls possessing neutron-absorbing properties, are released for fall into the reactor core to shut down the reactor.

Constructional examples of the invention will now be described with reference to the accompanying drawings, wherein:

FIGURE 1 is a fragmentary side view in section on line I—I of FIGURE 2 and illustrates one construction of restraint means according to the invention, FIGURE 2 is a plan view in section on line II—II of FIGURE 1, FIGURE 3 is a fragmentary side view in section on line III—III of FIGURE 4 and illustrates another construction of restraint means, and FIGURE 4 is a plan view in section on line IV—IV of FIGURE 3.

Referring to the drawings, in the construction shown therein as applied by way of example to nuclear reactor shutdown apparatus such as that shown and described in the said copending application No. 22,204 there is provided a restraint means comprising a tubular member 1 having six part-annular pole pieces 2 provided on the interior of the tubular member and joined thereto by webs 3 so as to leave part-annular spaces 4 occupied by windings 5 surrounding each web 3. The pole pieces 2 are symmetrically disposed and adjacent pole pieces 2 are of opposite polarity, determined by the direction of the windings 5. Adjacent edges of the pole pieces 2 have interposed between them fillets 6 of non-magnetic material which preserve continuity of surface and with the pole pieces 2 present a smooth internal cylindrical wall.

The restraint means is preferably incorporated in nuclear reactor shut-down apparatus in a position at which it is desired to hold neutron-absorbing balls from discharge into the reactor core. In the apparatus shown and described in the last mentioned copending application No. 22,204 the restraint means would be provided at an equivalent vertical position and in substitution for the valve plug 11 and its seat 12 (these reference numerals referring to FIGURE 1b of said copending application) thereby providing that when the balls are held in readiness for discharge, they are in the channels penetrating the neutron shield of the reactor and in registration with the neutron shield so as effectively to form a part of the neutron shield. In the accompanying drawings, an upper tubular part 7, shown in dot-and-dash lines in FIGURE 1, represents that part of the apparatus in which the balls are held in readiness, and a lower tubular part 8, also shown in dot-and-dash lines in FIGURE 1, represents that part of the apparatus into which the balls are discharged on operation of the device. The restraint means is disposed with its tubular member 1 so arranged in relation to the parts 7 and 8 that a smooth passage for the balls is presented.

In FIGURE 2, a few neutron-absorbing balls 9 are illustrated. Lines of force, for example as indicated by the reference character L for three of the pole pieces 2, traverse the balls 9 and the magnetic field serves to lock at least those contained in an annular volume whose outer boundary is the cylindrical wall formed by the pole pieces 2 and fillets 6 and the position of whose inner boundary depends on the diameter of the passage between the pole pieces 2 and the strength of the magnetic field. By suitable choice of these parameters and of the ball diameter, it is possible to ensure that all the balls which are in register with the restraint means are interlocked and thus prevented from discharge and furthermore serve to support a column of balls disposed in the tubular part 7 above the restraint means. However, as an alternative, there may be provided a central baffle 10 (shown in dot-and-dash lines in FIGURES 1 and 2) whose outer cylindrical surface is, by suitable choice of parameters, arranged to coincide with the inner cylindrical boundary of the said annular volume, whereby the magnetic field is effective to lock all the balls which are in register with the restraint means. It will be appreciated that a null point exists at the axis of the tubular member 1.

Interruption of the supply of current to the windings 5 serves to remove the magnetic field and allow the column of balls 9 to fall by gravity into the reactor core for shut-down. It is conveniently arranged that the windings of adjacent or opposed pairs of pole pieces 2 of opposite polarity are separately supplied with current and that each of the three resulting circuits is broken on operation of a reactor trip.

Operation of one trip, which might be spurious and caused by a mechanical or electrical rather than a reactor fault, cuts out one pair of pole pieces, but it is arranged that the magnetic field remaining is still sufficient to retain the balls from falling into the reactor core. Operation of two out of the three trips, however, reduces the magnetic field sufficiently to release the balls 9 so that they fall into the core and shut down the reactor.

The neutron-absorbing balls are conveniently of stainless steel containing approximately 1% of boron and are of ¼" diameter, whilst the diameter of the passage within the restraint means to contain them is about 3" and the depth of the pole pieces is about 12".

In order to reduce or overcome residual magnetism in the balls and pole pieces which might prevent operation of the device on interruption of current to some or all of the windings, it can be arranged for an alternating current of varying strength to be applied to the pole pieces coincident with interruption of direct current to the pole pieces.

Referring now to FIGURES 3 and 4 there is shown a restraint means similar to that illustrated by FIGURES 1 and 2 and wherein the pole-pieces 2 are spaced from the inner surface of the tubular member 1 by nickel inserts 16 so as to leave the part-annular spaces 4 which are occupied by the windings 5. The inserts 16 together with the pole pieces 2 are secured to the inner surface of the tubular member 1 by counter-sunk bolts 11 penetrating holes 12 and 13 in the tubular member 1 and inserts 16 respectively, to terminate in screw-threaded holes 14 in the inner faces of the pole-pieces 2.

In an emergency such as that occasioned by pressure vessel failure, or gross coolant duct fracture, resultant rise in temperature may cause distortion of the reactor core and prevent entry of the conventional control rods. However, such temperature rise will cause the temperature of the nickel inserts 16 to rise to or beyond their Curie point. This will increase the reluctance of the electromagnets formed by the windings 5 and pole-pieces 2 sufficiently to allow release of the balls 9 which can find their way into the core even though the channels therein may have become somewhat mis-shapen by the distortion.

The construction thus provides a temperature-sensitive emergency shut-down apparatus for nuclear reactors which is entirely independent of electrical or mechanical initiation means. The material of the inserts 16 is chosen so that the Curie point of the material is exceeded when a given temperature in the vicinity of the inserts 16 (which temperature corresponds to the maximum safe operating temperature of the reactor) is exceeded. Nickel for instance has a Curie point of 350° C. and is suitable for a maximum safe reactor operating temperature (i.e. the temperature of outlet coolant) of up to 600° C., the apparatus being partly cooled, for example by inlet coolant at about 250° C. contacting the exterior of the tube 1.

Temperature sensitive devices of this type are applicable to all reactor shut-down apparatus wherein neutron-absorbing bodies are releasably held from insertion into a reactor core by an electro-magnet.

The pole pieces may alternatively be permanent magnets and be of, or incorporate, material whose Curie point when exceeded causes interruption or reduction of magnetic flux sufficiently to allow discharge of the absorber balls into the reactor core. Employment of permanent magnets makes the apparatus independent of electrical supplies both for operation and initiation.

I claim:

1. For installation in a nuclear reactor for shut-down thereof, restraint means for releasably restraining a multiplicity of discrete bodies the material of which at least includes magnetic material and which possess neutron absorbing properties, said restraint means comprising at least one pair of magnetic pole pieces of opposite polarity and comprising part-cylindrical surfaces, non-magnetic fillets separating adjacent pole pieces, said pole pieces and said fillets providing in combination a hollow cylindrical passage most of whose wall is formed by said pole piece surfaces and the remainder of whose wall is formed by a surface of each said fillet, said passage being disposed when in operative position with its axis having at least a substantial vertical component and forming a container for said bodies in which said bodies are restrained by magnetic force against movement along said passage, whereby demagnetisation of said pole pieces serves to release said bodies for movement under gravity along and out of said passage for transmission into a reactor core.

2. For installation in a nuclear reactor for shut-down thereof, restraint means according to claim 1, wherein a cylindrical baffle is disposed axially in said passage to extend at least the whole length of the passage, whereby to occupy a position at which magnetic flux is at a minimum and thus prevent said position being occupied by said bodies.

3. For installation in a nuclear reactor for shut-down thereof, restraint means according to claim 1, wherein there are three pairs of electromagnetic pole pieces, the members of each pair being of opposite polarity and adjacent pole pieces being of opposite polarity, a winding for each pole piece, the winding of opposed pole pieces being connected for providing three independent energizing circuits, each energizing circuit being provided with a switch adapted for operation by a reactor trip, whereby with three or two circuits energized, there may be sufficient magnetic force for continued restraint of said bodies from movement along said passage, whereas with one circuit only energized, there may be insufficient magnetic force for restraint of said bodies, thereby releasing said bodies for movement under gravity along and out of said passage for transmission into a reactor core.

4. For installation in a nuclear reactor for shut-down thereof, restraint means according to claim 3, including means for applying an alternating current of varying strength to said pole pieces coincident with interruption of two or all three of said energizing circuits, whereby any residual magnetism in said pole pieces or said bodies remaining after de-energization of said two or all three circuits is reduced for ensuring rapid release of bodies in said passage.

5. For installation in a nuclear reactor for shut-down thereof, restraint means according to claim 1, including a discrete portion of material interrupting the flux path of each pole piece, said material being different from the material of the pole piece and having a Curie point below that of the pole piece material, said Curie point being adapted to be related to the maximum safe operating temperature of the reactor in such a manner that should said temperature be exceeded, the Curie point of said portions will be exceeded, thereby reducing magnetic flux sufficiently to fail to restrain said bodies from movement under gravity along and out of said passage for transmission into the reactor core.

References Cited in the file of this patent

UNITED STATES PATENTS

| | | |
|---|---|---|
| 564,859 | Whitacre et al. | July 28, 1896 |
| 998,486 | Fauntleroy | July 18, 1911 |
| 1,259,788 | Sekinger | Mar. 19, 1918 |
| 1,392,413 | Gow | Oct. 4, 1921 |
| 1,491,600 | Fernow | Apr. 22, 1924 |
| 2,773,823 | Goett | Dec. 11, 1956 |

FOREIGN PATENTS

| | | |
|---|---|---|
| 225,751 | Great Britain | Dec. 11, 1924 |

OTHER REFERENCES

NAA–SR–1049, issued Sept. 1, 1954, declassified, Mar. 15, 1957, pp. 86–91.

KAPL–1528 (TID–4500, 11th ed.), issued Jan. 17, 1955, unclassified; "An Electronic Trip System for Reactor Projection—Model D," p. 11.

ANL–5244 (Del. 2), issued Nov. 1955, declassified Mar. 18, 1957, p. 8.